Figure 1:
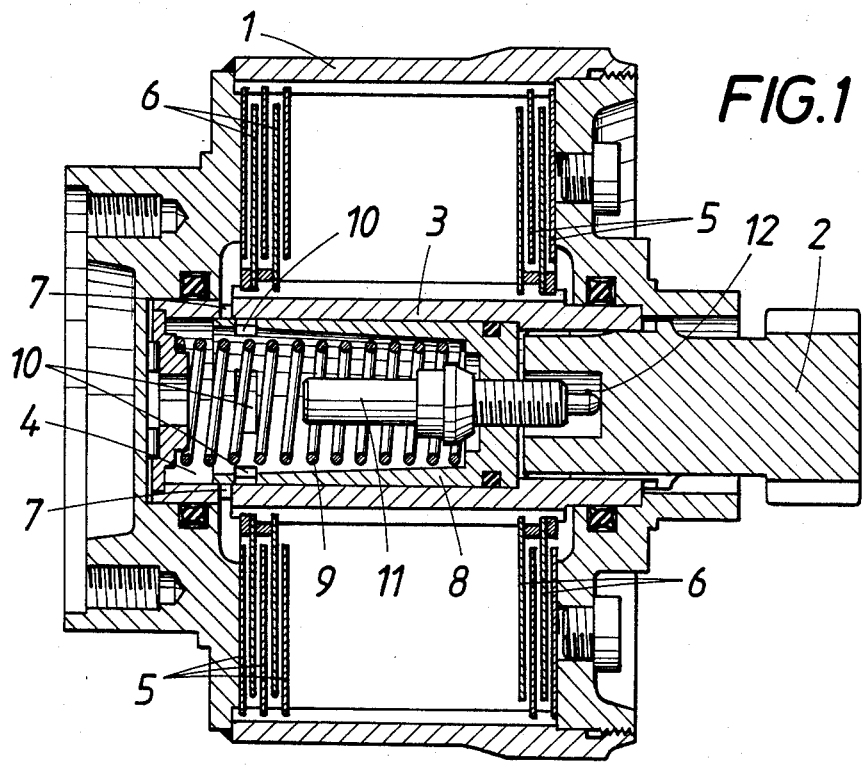

United States Patent [19]

Leinfellner et al.

[11] Patent Number: 4,703,842
[45] Date of Patent: Nov. 3, 1987

[54] LIQUID FRICTION COUPLING

[75] Inventors: Herwig Leinfellner, Graz; August Kriebernegg, Köflach, both of Austria

[73] Assignee: Steyr-Daimler-Puch Aktiengesellschaft, Vienna, Austria

[21] Appl. No.: 883,611

[22] Filed: Jul. 9, 1986

[30] Foreign Application Priority Data

Jul. 16, 1985 [AT] Austria ................................. 2095/85

[51] Int. Cl.$^4$ ...................... F16D 35/00; F16D 43/25
[52] U.S. Cl. .................................. 192/58 B; 192/82 T
[58] Field of Search ...................... 192/58 B, 58 C, 83

[56] References Cited

U.S. PATENT DOCUMENTS

| 4,090,596 | 5/1978 | Blair | 192/82 T |
| 4,351,425 | 9/1982 | Bopp | 192/82 T |
| 4,425,879 | 1/1984 | Shadday et al. | 192/82 T X |

FOREIGN PATENT DOCUMENTS

| 136580 | 4/1985 | European Pat. Off. |
| 2607353 | 9/1976 | Fed. Rep. of Germany . |
| 1551318 | 12/1968 | France . |

Primary Examiner—George H. Krizmanich
Attorney, Agent, or Firm—Kurt Kelman

[57] ABSTRACT

A liquid friction coupling, which preferably constitutes a differential arranged in the shaft line between two driven axles of a vehicle, consists of a rotatable housing (1), which is filled with a viscous liquid, a shaft (2), which protrudes into the housing (1), and a number of interdigitating blades (5, 6). The blades (5) of one set are non-rotatably connected to the housing (1) and the blades (6) of the other set are non-rotatably connected to the shaft (2). The shaft (2) includes a cavity (4), which serves to receive liquid from the housing (1) and contains a spring-loaded slider (8). In order to effect an automatic control of the torque which can be transmitted during the starting period, the slider in the cavity (4) of the shaft constitutes a sliding valve member (8), which cooperates with slots or the like, which are formed in the shaft and lead into the housing (1). The sliding valve member (8) is adjustable in dependence on a performance variable, preferably in dependence on temperature.

5 Claims, 3 Drawing Figures

LIQUID FRICTION COUPLING

This invention relates to a liquid friction coupling consisting of a rotatable housing, which is filled with a viscous liquid, a shaft, which protrudes into the housing, and two sets of interdigitating blades, one set of the blades being non-rotatably connected to the housing and the other set to the shaft, wherein the shaft defines a cavity serving to receive liquid from the housing through a spring-loaded sliding member displaceably mounted in the cavity.

Such a liquid friction coupling is known from published German Application No. 2,607,353. But in that coupling the slider consists of a piston, which is guided in the cavity of the shaft and is always contacted at one end by the viscous fluid, which can enter the cavity from the housing through slots which are formed in the shaft and are always open. That piston bears at its other end on a compression spring and is intended during operation to compensate for the increase of the volume of the viscous liquid which results from the temperature rise caused by the friction of the blades during operation so that the pressure in the liquid being heated will not increase the torque which can be transmitted.

It is also known from EP-A No. 136 580 to provide a liquid friction coupling in which the viscous liquid circulates between a supply chamber and a working chamber and in which the liquid flows to the working chamber through a valve, which is controlled in dependence on temperature, and returns to the supply chamber through pumping means. But this liquid friction coupling comprises only one driving disc and a housing, which is mounted to be rotatable relative to the driving disc. Such liquid friction couplings are used, as a rule, to drive a fan for causing a stream of cooling air to flow through the radiator of an internal combustion engine but the liquid friction coupling is not adapted to transmit substantial torques.

A problem arising in liquid friction couplings in general is due to the fact that the transmitted torque is relatively high as the coupling is started up because the liquid filling the coupling is still cold so that it has a higher viscosity and the torque subsequently decreases as a result of the temperature rise oo the liquid which is due to the friction. In some applications, however, it is desired to reduce the starting torque or to achieve a rather uniform torque during the startng period, particularly when such coupling is used as a differential between two driven axles of a motor vehicle and a straining of the power-transmitting shaft in case of a cold start is to be avoided.

For this reason it is an object of the invention to improve the liquid friction coupling described first hereinbefore with simple means and in such a manner that the transmitted torque will be automatically controlled during the starting period.

The object set forth is accomplished in accordance with the invention by displaceably mounting a sliding valve member in the cavity of the shaft to cooperate with slots or the like, formed in the shaft and lead into the housing. The sliding valve member is adjustable in a manner known per se in dependence on a performance variable, preferably on temperature.

As a result, the cavity in the shaft does not always communicate witht he interior of the housing but, owing to the sliding valve member cooperating with the slots or the like in the shaft, communicates with the interior of the housing only for a certain time, e.g., after a standstill of the coupling. During that time, the cavity will be filled with the viscous liquid and when the slots or the like have subsequently been closed, a part of the liquid is separated from the remaining quantity in the housing. When the liquid is cold at the time of a start, the slots or the like in the shaft remain closed for a time so that the presence of a smaller quantity of liquid in the interior of the housing and between the blades will wet the blades on a smaller surface area so that the torque which can be transmitted during a start will also be reduced. After an operation for some time or after a certain temperature rise, the slots or the like in the shaft are opened so that the liquid from the cavity in the shaft flows under centrifugal force into the housing and all surfaces in the housing will be wetted and the transmitted torque will decrease only slightly in spite of the temperatuure rise. When a certain operating condition has been reached, the slots or the like in the shaft, which have been opened in the meantime, are closed by the sliding valve member and the processes which have been described are repeated when the coupling is put out of operation or at a standstill. The performance parameter which is used as a measure and/or cause of the displacement of the sliding valve member may simply be constituted by the temperature inside the coupling or outside the coupling in a succeeding transmission portion or the like. Alternatively, the adjustment of the sliding valve member may be effected in dependence on a different paramemter, e.g., on the pressure of the lubricating oil in an element of the power-transmitting shaft in which the coupling is incorporated, particularly because the pressure of the lubricating oil also depends on temperature at least in part.

If the temperature of the viscous liquid is used as the controlling variable for the adjustment of the valve member, it will be desirable to provide in accordance with the invention an element made of high-expansion material or an element made of a memory alloy or the like, which element is inserted in the sliding valve member, and to cause that element to be supported on a stop surface of the shaft against the spring force. That arrangement will be desirable because it requires only a small space and because there is an effective heat transfer from the liquid in the housing through the surfaces defining the shaft and the cavity to the sliding valve member.

Figure 2:
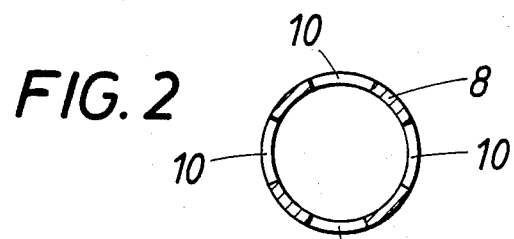
Figure 3:
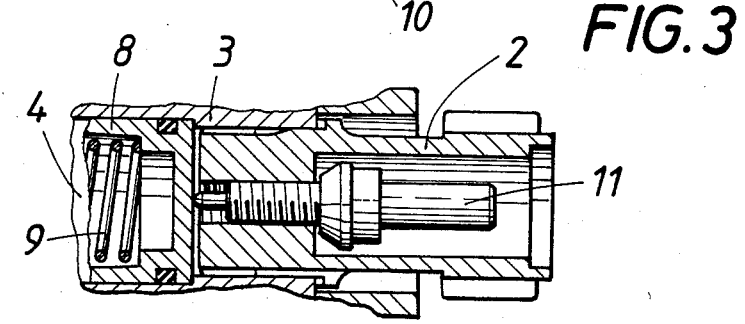

The subject matter of the invention is illustrated by way of example on the drawing, in which FIG. 1 is an axial sectional view showing a liquid friction coupling, FIG. 2 is a transverse sectional view showing the sliding valve member adjacent to its slots and FIG. 3 is a view that is similar to FIG. 1 and shows a part of a modified coupling.

A differential incorporated in a shaft for driving a second axle of a motor vehicle and disposed between the two axles of the vehicle consists of a liquid friction coupling. That coupling comprises a housing 1, which is filled with a viscous liquid and to which one part of the driving shaft is adapted to be flange-connected. The coupling also comprises a shaft 2, which protrudes into the housing and is connected to the other part of the driving shaft. The shaft 2 extends into and has a tubular extension defining a cavity 4. A number of interdigitating blades 5, 6 are disposed between the housing 1 and the shaft 2. Those blades 6, which constitute the outer set, are non-rotatably connected to the housing 1. Those blades 5, which constitute the inner set, are non-rotatably connected to the shaft 2 and/or its tubular extension 3. A sliding valve member 8 is disposed in the cavity 4, which communicates through slots 7 in the shaft extension with the interior of the housing 1. The sliding valve member is biased and held in the illustrated initial position by a compression spring 9. The sliding valve member 8 has slots 10. An element 11 made of high-expansion material is screwed into the sliding valve member 8, as is shown in FIG. 1, and bears on a stop surface 12, on the shaft 2 and is normal to the axis thereof.

At the beginning of the operation, only part of the viscous liquid is contained in the interior of the housing 1and another part is enclosed in the cavity 4. The friction occurring during operation results in a temperature rise, causing the material of the element 11 to expand and thereby to push the sliding valve member 8 to the left against the force of the spring 9 so that the slots 10, 7 register and the part of the liquid which is contained in the cavity 4 flows under the action of centrifugal force into the housing 1. Thereafter the slots 7 are closed again because the sliding valve member is moved further to the left as far as to a stop. When the coupling is arrested, the element 11 made of high-expansion material contracts owing to the temperature drop and the sliding valve member 8 is moved back to the right. When the slots 7, 10 are in register, the differential pressure causes liquid to flow back from the housing 1 into the cavity 4 and said liquid is entirely separated from the liquid in the housing 1 when the sliding valve member 8 has reached its illustrated end position.

In accordance with FIG. 3, the element 11 made of high-expansion material has been screwed into the shaft 2 rather than into the sliding valve member 8 so that the element 11 can apply pressure directly on the sliding valve member and is subjected to the temperature in the environment directly surrounding the coupling. Instead of an element 11 made of high-expansion material, the control element for adjusting the sliding valve member 8 might consist of a push rod, which is slidably mounted in the shaft 2 and may be displaced in any desired manner and/orin dependence on other parameters.

We claim:

1. A liquid friction coupling comprising
   (a) a housing defining a chamber filled with a viscous liquid,
   (b) a shaft protruding into the housing and defining a cavity surrounded by the housing chamber,
   (c) two sets of interdigitating blades disposed in the housing chamber, one set of the blades being non-rotatably connected to the housing and the other set of the blades being non-rotatably connected to the shaft,
   (d) slot means in the shaft for providing communication between the cavity and the housing chamber whereby the viscous liquid may flow into and out of the cavity from and into the housing chamber,
   (e) a spring-loaded sliding valve member displaceably mounted in the cavity in a rest positon wherein it closes the slot means for preventing viscous liquid flow between the cavity and the housing chamber, and
   (f) means responsive to a performance variable of the coupling for displacing the sliding valve member from the rest position into an actuated positon wherein it opens the slot means for causing viscous liquid flow from the cavity into the housing chamber.

2. The liquid friction coupling of claim 1, wherein the performance variable is temperature.

3. The liquid friction coupling of claim 2, wherein the sliding valve displacing means is an element made of a material expanding in response to a rise in ambient temperature and acting upon the sliding valve member upon expansion of the material to displace the sliding valve member.

4. The liquid friction coupling of claim 3, wherein the displacing element is inserted in the sliding valve member, and the shaft has a stop surface adjacent the cavity, the displacing element engaging the stop surface and displacing the sliding valve member against the spring bias upon expansion of the displacing element.

5. The liquid friction coupling of claim 3, wherein the displacing element is inserted in the shaft adjacent the cavity, and the sliding valve member has a stop surface, the displacing element engaging the stop surface and displacing the sliding valve member against the spring bias upon expansion of the displacing element.

* * * * *